(12) United States Patent
Wang et al.

(10) Patent No.: US 10,836,016 B2
(45) Date of Patent: Nov. 17, 2020

(54) ABRASIVE ARTICLES INCLUDING AGGREGATES OF SILICON CARBIDE IN A VITRIFIED BOND

(71) Applicants: SAINT-GOBAIN ABRASIVES, INC., Worcester, MA (US); SAINT-GOBAIN ABRASIFS, Conflans-Sainte-Honorine (FR)

(72) Inventors: Jianna Wang, Grafton, MA (US); Shih-Chieh Kung, Worcester, MA (US); Timothy E. Scoville, Winchendon, MA (US); Shyiguei Hsu, Plano, TX (US); Fernando J. Ramirez, Reynosa (MX); Zhong Xu, Holden, MA (US)

(73) Assignees: SAINT-GOBAIN ABRASIVES, INC., Worcester, MA (US); SAINT-GOBAIN ABRASIFS, Conflans-Sainte Honorine (FR)

(*) Notice: Subject to any disclaimer, the term of this patent is extended or adjusted under 35 U.S.C. 154(b) by 184 days.

(21) Appl. No.: 15/824,515

(22) Filed: Nov. 28, 2017

(65) Prior Publication Data
US 2018/0178353 A1 Jun. 28, 2018

Related U.S. Application Data

(60) Provisional application No. 62/438,757, filed on Dec. 23, 2016.

(51) Int. Cl.
*B24D 18/00* (2006.01)
*B24D 3/14* (2006.01)
*C09K 3/14* (2006.01)

(52) U.S. Cl.
CPC .......... *B24D 18/0072* (2013.01); *B24D 3/14* (2013.01); *C09K 3/1436* (2013.01)

(58) Field of Classification Search
None
See application file for complete search history.

(56) References Cited

U.S. PATENT DOCUMENTS

| 2,958,593 A | * | 11/1960 | Hoover | .................. A47L 13/04 |
| | | | | 51/295 |
| 5,738,697 A | | 4/1998 | Wu et al. | |
| 5,919,549 A | * | 7/1999 | Van | ........................ B24D 3/004 |
| | | | | 51/298 |

(Continued)

FOREIGN PATENT DOCUMENTS

WO 2002074492 A2 9/2002

OTHER PUBLICATIONS

International Search Report and Written Opinion for PCT/US2017/063435, dated Mar. 14, 2018, 15 pages.

*Primary Examiner* — Colleen P Dunn
*Assistant Examiner* — Ross J Christie
(74) *Attorney, Agent, or Firm* — Abel Schillinger, LLP; Joseph Sullivan

(57) ABSTRACT

The present disclosure relates to abrasive articles that include abrasive aggregates of silicon carbide with a vitrified bond, and methods of making and using such abrasive articles and abrasive aggregates. In particular, the abrasive aggregates can possess a combination of beneficial properties and comprise a vitreous binder composition having a specific composition, sintering temperature, glass transition temperature, or a combination thereof.

17 Claims, 12 Drawing Sheets

(56) References Cited

U.S. PATENT DOCUMENTS

| | | | |
|---|---|---|---|
| 6,354,929 B1 | 3/2002 | Adefris et al. | |
| 6,428,587 B1 | 8/2002 | Ito | |
| 6,551,366 B1* | 4/2003 | D'Souza | B24D 3/14 51/295 |
| 6,572,666 B1* | 6/2003 | Nettleship | B24D 3/28 51/293 |
| 6,620,214 B2 | 9/2003 | McArdle et al. | |
| 6,706,083 B1 | 3/2004 | Rosenflanz | |
| 6,749,653 B2 | 6/2004 | Castro et al. | |
| 6,797,023 B2* | 9/2004 | Knapp | B24D 3/04 51/298 |
| 8,491,681 B2 | 7/2013 | Chuda et al. | |
| 8,974,560 B2 | 3/2015 | Wang et al. | |
| 2004/0221515 A1 | 11/2004 | McArdle et al. | |
| 2007/0020457 A1 | 1/2007 | Adefris | |
| 2007/0084133 A1* | 4/2007 | Schwabel | B24D 3/16 51/307 |
| 2013/0012112 A1 | 1/2013 | Hsu et al. | |
| 2013/0298471 A1* | 11/2013 | Cai | B24D 3/28 51/295 |
| 2014/0378036 A1* | 12/2014 | Cichowlas | B24D 5/12 51/307 |
| 2015/0158148 A1* | 6/2015 | Sharmila | B24D 11/02 51/298 |
| 2016/0194540 A1 | 7/2016 | Wang et al. | |
| 2017/0197293 A1 | 7/2017 | Garg et al. | |

\* cited by examiner

ABRASIVE ARTICLES INCLUDING AGGREGATES OF SILICON CARBIDE IN A VITRIFIED BOND

CROSS-REFERENCE TO RELATED APPLICATION

This application claims priority under 35 U.S.C. § 119(e) to U.S. Provisional Patent Application No. 62/438,757, entitled "Abrasive Articles Including Aggregates of Silicon Carbide in a Vitrified Bond", by Jianna Wang, Shih-Chieh Kung, Timothy E. Scoville, Shyiguei Hsu, Fernando J. Ramirez, and Zhong-John Xu, filed Dec. 23, 2016, which is assigned to the current assignee hereof and incorporated herein by reference in its entirety.

FIELD OF THE DISCLOSURE

The present disclosure relates to abrasive aggregates of silicon carbide with a vitrified bond, and methods of making and using such abrasive aggregates, including in abrasive articles.

BACKGROUND

Abrasive products; such as coated abrasives, bonded abrasives, nonwoven abrasives, and loose abrasives; are used in various industries to abrade work pieces, such as by lapping, grinding, or polishing. Surface processing using abrasive products spans a wide industrial scope from initial coarse material removal to high precision finishing and polishing of surfaces at a submicron level. Effective and efficient surface processing of extremely hard surfaces, such as metal surfaces, ceramic surfaces, and ceramic hybrid surfaces poses numerous challenges, including how to achieve high material removal rates. Therefore, the industry continues to demand further improved abrasive products.

BRIEF DESCRIPTION OF THE DRAWINGS

Embodiments are illustrated by way of example and are not limited in the accompanying figures.

Figure 1A:
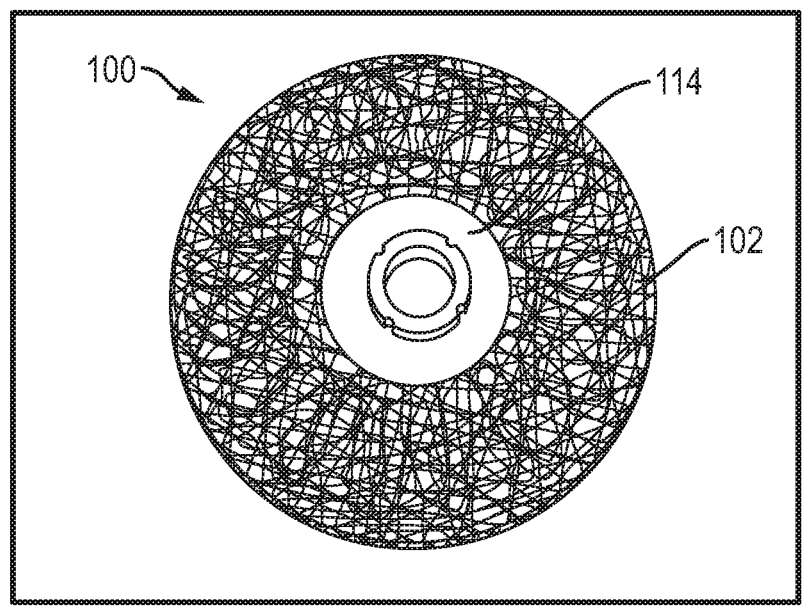
FIG. 1A is a depiction of an embodiment of a nonwoven abrasive article.

Skilled artisans will appreciate that elements in the figures are illustrated for simplicity and clarity and have not necessarily been drawn to scale. For instance, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "aggregate" may be used to refer to a particle made of a plurality of smaller particles that have been combined in such a manner that it is relatively difficult to separate or disintegrate the aggregate particle into smaller particles by the application of hand pressure or hand agitation. This is in contrast to the term "agglomerate," which is used herein to refer to a particle made up of a plurality of smaller particles that have been combined in such a manner that it is relatively easy to separate the agglomerate particle or disintegrate the agglomerate particle back into smaller particles, such as by the application of hand pressure or hand agitation.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the abrasive arts.

FIG. 1A shows a depiction of an embodiment of an abrasive article 100 comprising a substrate comprising a nonwoven web of lofty fibers 102. The abrasive article can have an attachment component 114, such as an attachment button.

Figure 1B:
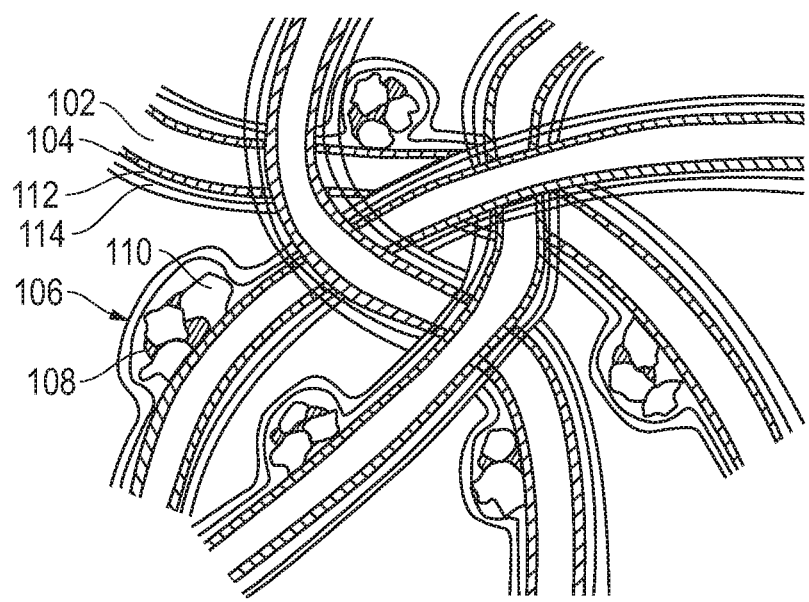
FIG. 1B is an illustration of an embodiment of a substrate comprising a nonwoven web of lofty fibers and abrasive aggregates.

FIG. 1B shows an illustration of an embodiment of a substrate comprising a nonwoven web of lofty fibers 102. An abrasive composition is disposed on and within the nonwoven web. The abrasive composition is adhered to the fibers 102 and comprises a polymeric binder composition 104 (also called herein a "make" resin or make coat) and a plurality of abrasive aggregates 106 disposed in contact with the polymeric binder composition 104. Each abrasive aggregate of the plurality of abrasive aggregates comprises a vitreous binder composition 108 and a plurality of silicon carbide abrasive grit particles 110. The vitreous binder composition 108 is disposed between the silicon carbide grit particles 110 and forms an interface between the grit particles. The bond interface can be in the form of bond posts at the points of contact between the grit particles or a coating on the abrasive grit particles. Bond posts typically are present when the amount of vitreous binder composition is low. At higher amounts of vitreous binder composition the silicon carbide grit particles can be partially coated with, fully coated with, or even dispersed in the vitreous binder composition. A second polymeric binder coating 112 (also called herein an "intermediate" coat), such as an acrylic latex, overlies the polymeric binder composition 104. A polymeric size coat 114 (also called herein a "size" resin or size coat) overlies the second polymeric binder coating 112.

Figure 2A:
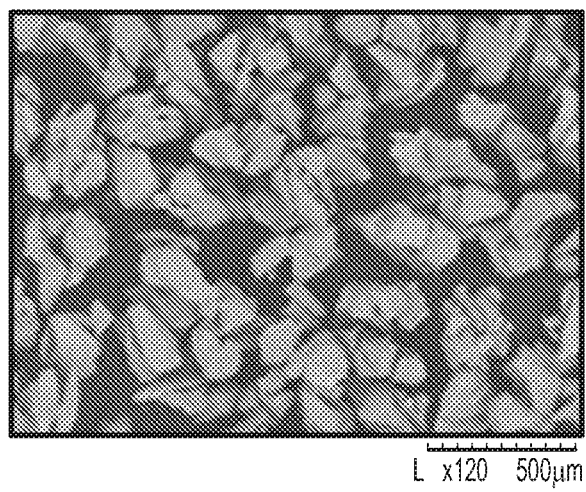
FIG. 2A is an image of a plurality of abrasive aggregates according to an embodiment.
Figure 2B:
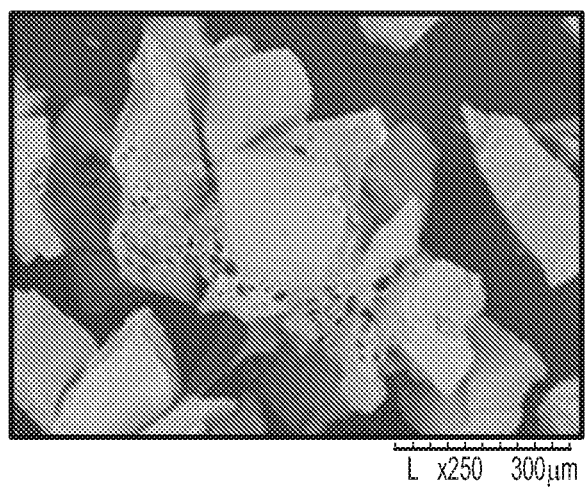
FIG. 2B is a magnified image of the aggregates shown in FIG. 2A.

FIG. 2A shows an image of an embodiment of an abrasive aggregate comprising a vitreous binder composition, and silicon carbide abrasive grit particles. The vitreous binder composition is disposed between the silicon carbide grit particles and forms an interface between the grit particles. The bond interface can be in the form of bond posts at the points of contact between the grit particles or a coating on the abrasive grit particles. The aggregates of FIG. 2A have an aggregate size between 25/70 mesh and the silicon carbide grit particles are size F100. The vitreous binder has a firing temperature of 950° C. FIG. 2B shows the same aggregates of FIG. 2A at a larger magnification. Applicants further point out that FIG. 2B show that the glass bonded SiC aggregates have bubbles at the interface between grit particles and the vitreous bond. The bubbles are thought to be caused by generation of carbon dioxide during firing at 950° C. as SiC is oxidized: $SiC + 2O_2 = SiO_2 + CO_2$.

Figure 3A:
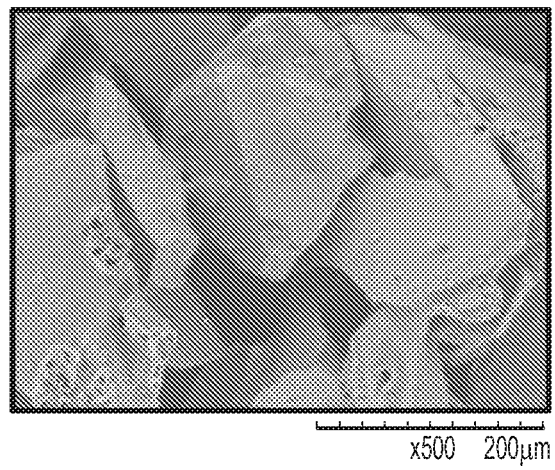
FIG. 3A is a magnified image of another aggregate according to an embodiment.
Figure 3B:
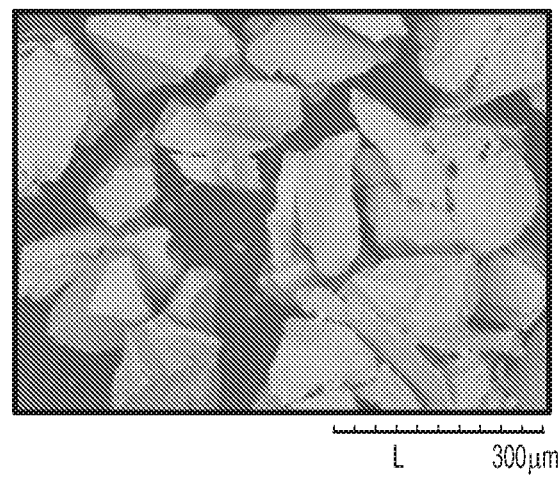
FIG. 3B is a magnified image of another aggregate according to an embodiment.

FIG. 3A shows an image of an embodiment of an abrasive aggregate comprising a vitreous binder composition, and silicon carbide abrasive grit particles. The vitreous binder composition is disposed between the silicon carbide grit particles and forms an interface between the grit particles. The bond interface can be in the form of bond posts at the points of contact between the grit particles or a coating on the abrasive grit particles. The aggregates of FIG. 3A have an aggregate size between 20/100 mesh (0.15-0.85 mm) and the silicon carbide grit particles are size F100. The vitreous binder has a firing temperature of 750° C. FIG. 3B shows an image of another embodiment of an abrasive aggregate comprising a vitreous binder composition, and abrasive grit particles dispersed in the vitreous binder composition, wherein the abrasive particles are silicon carbide. The aggregates of FIG. 3B have an aggregate size between 20/70 mesh (0.21-0.85 mm) and the silicon carbide grit particles are size F120. The vitreous binder has a firing temperature of 950° C. Applicants point out that in FIG. 3A there are no bubbles at the grain interface, while on the other hand in FIG. 3B there are bubbles at the interface between the grain and bond.

Figure 4A:
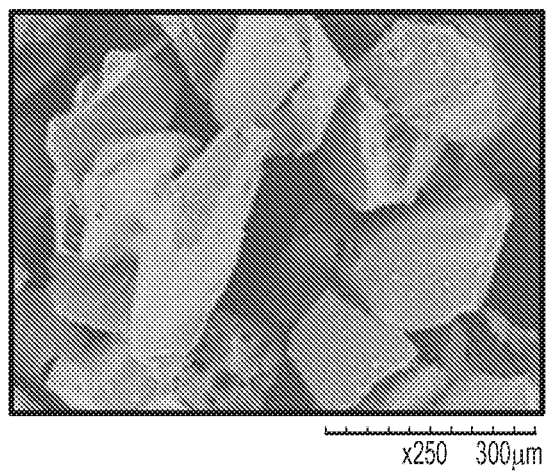
FIG. 4A is a magnified image of another aggregate according to an embodiment.
Figure 4B:
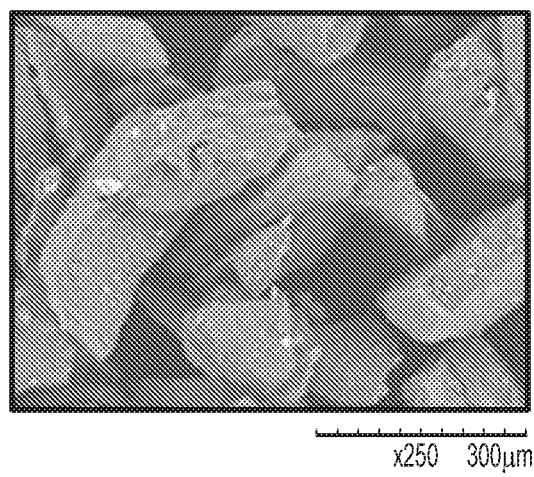
FIG. 4B is a magnified image of another aggregate according to an embodiment.

FIG. 4A shows an image of an embodiment of an abrasive aggregate comprising a vitreous binder composition, and silicon carbide abrasive grit particles. The vitreous binder composition is disposed between the silicon carbide grit particles and forms an interface between the grit particles. The bond interface can be in the form of bond posts at the points of contact between the grit particles or a coating on the abrasive grit particles. The aggregates of FIG. 4A have an aggregate size between 20/100 mesh (0.15-0.85 mm) and the silicon carbide grit particles are size F100. The vitreous binder has a firing temperature of 915° C. FIG. 4B shows an image of another embodiment of an abrasive aggregate comprising a vitreous binder composition, and abrasive grit particles dispersed in the vitreous binder composition, wherein the abrasive particles are silicon carbide. The aggregates of FIG. 4B have an aggregate size between 20/70 mesh (0.21-0.85 mm) and the silicon carbide grit particles are size F100. The vitreous binder of FIG. 4B also has a firing temperature of 915° C., but a different composition compared to FIG. 4A. Applicants point out that in FIG. 4A and FIG. 4B there are no bubbles at the grain interface. Applicants further point out that in FIG. 4A the vitreous binder composition appears to have melted and flowed between the grains; however the vitreous binder composition in FIG. 4B does not show any flow between the grains.

Figure 5:
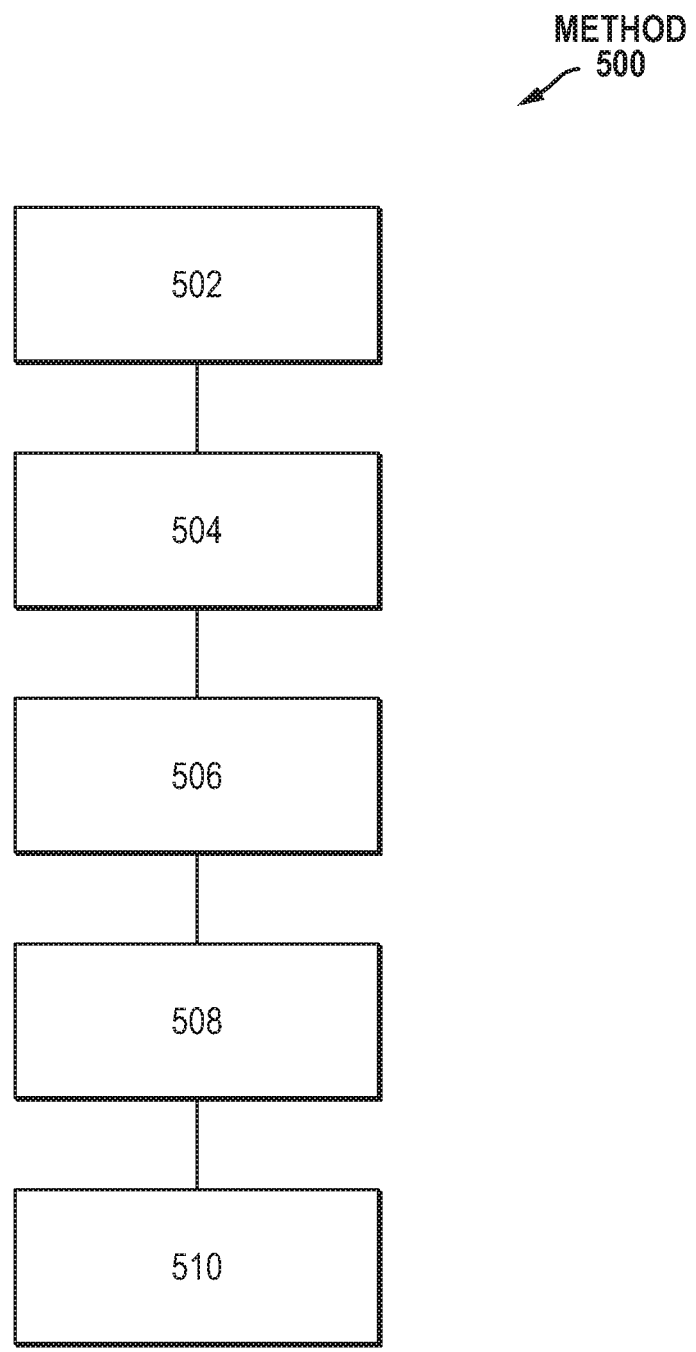
FIG. 5 is a process flow diagram of an embodiment of a method of making an abrasive aggregate.

FIG. 5 shows a process flow diagram of an embodiment of a method 500 of making an abrasive aggregate. Step 502 includes mixing together a plurality of abrasive particles, a vitreous binder composition, and a temporary organic binder to form a mixture, wherein the abrasive particles are silicon carbide. Step 504 includes shaping the mixture to form a plurality of abrasive aggregate precursor granules ("wet granules" by passing the mixture through a screen having a desired opening ("hole") size. Step 506 includes drying the wet aggregates precursor granules in an oven or on an infrared table to form dry precursor granules ("dry granules", also called unsintered or "green" precursor granules). Step 508 includes sintering the dry unsintered aggregate precursor granules at the required temperature for a given glass bond composition to form sintered abrasive aggregates. Step 510 includes crushing and sieving the sintered abrasive aggregates to obtain abrasive aggregates in desired particle size ranges.

Figure 6:
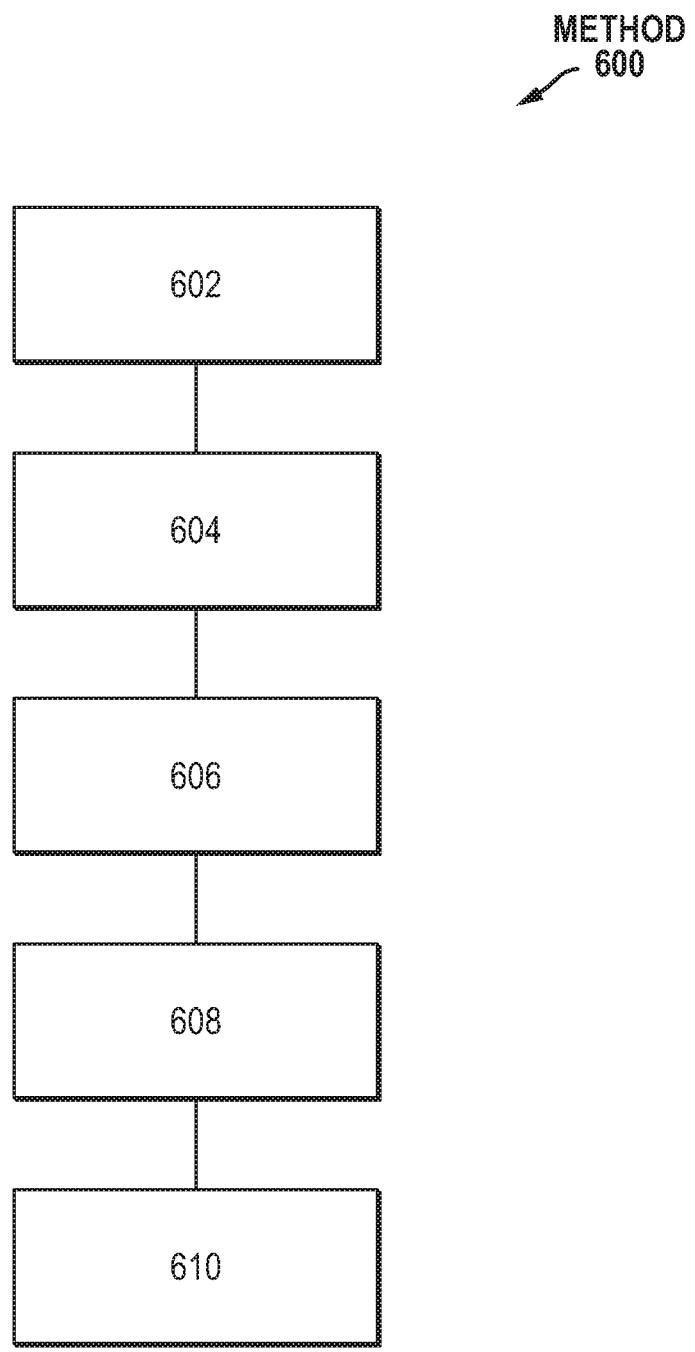
FIG. 6 is a process flow diagram of an embodiment of a method of making a nonwoven abrasive article that includes abrasive aggregates.

FIG. 6 shows a process flow diagram of an embodiment of a method 600 of making a nonwoven abrasive article. Step 602 includes disposing a polymeric binder composition on a nonwoven abrasive substrate comprising a lofty web of fibers. Step 604 includes disposing abrasive aggregates on the polymeric binder composition. Step 606 includes disposing an intermediate polymeric composition over the abrasive aggregates and the polymeric binder composition. Step 608 includes disposing a polymeric size coat composition over the abrasive aggregates and the polymeric intermediate composition. Step 610 includes curing the polymeric compositions.

Figure 7:
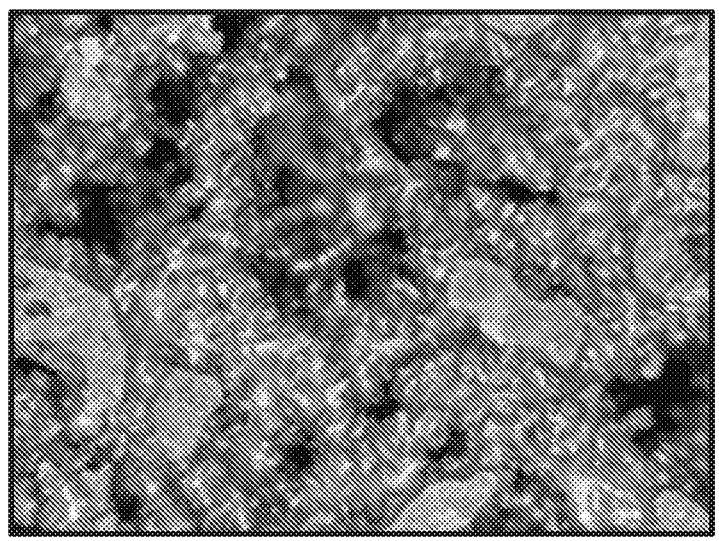
FIG. 7 is a magnified image of the surface of a completed embodiment of a nonwoven abrasive article that includes the abrasive aggregates of FIG. 2A adhered to the nonwoven substrate material.

FIG. 7 is a magnified image of the surface of a completed embodiment of a nonwoven abrasive article that includes the abrasive aggregates of FIG. 2A adhered to a nonwoven substrate material. The fibers of the nonwoven web are coated in a make resin. The abrasive aggregates are disposed on the make resin. A latex acrylic coating is disposed over the abrasive aggregates. A size resin composition is disposed over the latex acrylic coating.

Nonwoven Abrasive Article

In an embodiment, an abrasive article comprises: a substrate comprising a nonwoven web of lofty fibers; and an abrasive composition disposed on and within the nonwoven web, wherein the abrasive composition is adhered to the fibers and comprises a polymeric binder composition and a plurality of abrasive aggregates dispersed on or in the polymeric binder composition, and wherein each aggregate of the plurality of abrasive aggregates comprises a vitreous binder composition and a plurality of silicon carbide abrasive grit particles dispersed in the vitreous binder.

The amount of the nonwoven can vary. In an embodiment, the nonwoven web comprises at least 1 wt % of the abrasive article, such as at least 3 wt %, at least 5 wt %, or at least 10 wt %. In another embodiment, the nonwoven web comprises not greater than 50 wt % of the abrasive article, such as not greater than 47 wt %, not greater than 45 wt %, or not greater than 40 wt %. The amount of the substrate can be within a range of any minimum or maximum value noted above. In a specific embodiment, the amount of the nonwoven web comprises from at least at least 1 wt % to not greater than 50 wt % of the abrasive article.

The amount of the abrasive composition can vary. In an embodiment, the abrasive composition comprises at least 1 wt % of the abrasive article, such as at least 3 wt %, at least 5 wt %, or at least 10 wt %. In another embodiment, the abrasive composition comprises not greater than 50 wt % of the abrasive article, such as not greater than 47 wt %, not greater than 45 wt %, or not greater than 40 wt %. The amount of the abrasive composition can be within a range of any minimum or maximum value noted above. In a specific embodiment, the amount of the abrasive composition comprises from at least at least 1 wt % to not greater than 50 wt % of the abrasive article.

Nonwoven Substrate

In an embodiment, the abrasive article includes a nonwoven substrate material. The nonwoven substrate comprises a nonwoven web of lofty fibers. In an embodiment, the nonwoven substrate can include a nonwoven web of fibers formed from a single layer that is free of any additional layers of nonwoven webs of fibers ("single-ply" nonwoven). In another embodiment, the nonwoven substrate can include a nonwoven web of fibers that includes a plurality of layers of nonwoven webs of fibers ("multi-ply" nonwoven).

In an embodiment, the fibers of the nonwoven web of fibers can comprise polyamide fibers, polyimide fibers, polyester fibers, polypropylene fibers, polyethylene fibers, kenaf fibers, hemp fibers, jute fibers, flax fibers, sisal fibers, a blend thereof, or any combination thereof. In particular embodiments, the polyamide fibers can comprise a nylon, an aramid, or a combination thereof. In more particular embodiments, the nylon comprises nylon-6; nylon-6,6; or a combination thereof.

The nonwoven web of fibers can include fibers having a constant or variable linear density. In an embodiment, the fibers can have a constant linear density. In certain embodiments, the nonwoven web of fibers can include a blend of fibers including a plurality of fibers having a lower linear density and a plurality of fibers having a higher linear density. In further embodiments, the blend can include a bimodal blend of fibers, wherein a first modus is a first portion of fibers having a lower linear density and a second modus is a second portion of fibers having a higher linear density. In an embodiment, the difference between the first modus and second modus can be at least 20 denier to not greater than 50 denier.

In an embodiment, the nonwoven substrate can include a plurality of fibers having a linear density of at least about 1 denier, such at least 3 denier, at least 5 denier, at least 7 denier, at least 9 denier, or at least 10 denier. In another embodiment, the fibers can have a linear density not greater than 100 denier, such as not greater than 95 denier, not greater than 90 denier, or not greater than 80 denier. The fibers of the nonwoven substrate material can have a linear density that is within a range of any minimum or maximum value noted above. In a specific embodiment, the fibers have a linear density of at least 1 denier and not greater than 100 denier.

In an embodiment, the nonwoven substrate comprises only a single fiber (i.e., about 100 wt % of a fiber). In a specific embodiment, the nonwoven substrate comprises about 100 wt % of 15 denier fiber. In another specific embodiment, the nonwoven substrate comprises about 100 wt % of 60 denier fiber. In certain embodiments, the nonwoven substrate can be a blend of fibers. In an embodiment, the nonwoven web comprises 50 to 100 wt % of a first fiber and 0 to 50 wt % of a second fiber, such as up to 50 wt % of a first fiber and up to 50 wt % of a second fiber, such as not less than 70% of a first fiber and not greater than 30% of a second fiber. In a specific embodiment, the nonwoven web can comprise about 70 wt % of 60 denier fiber and about 30 wt % of 15 denier fiber.

The nonwoven web of fibers can comprise a specific fiber weight. In an embodiment, the nonwoven web of fibers can comprise a fiber weight in a range of not less than 1 lb./ream (1 ream=330 ft$^2$) to not greater than 20 lb./ream. In another embodiment, the weight of the nonwoven substrate per unit area can be at least about 1 GSM, such as about 10 GSM, at least 12 GSM, at least 14 GSM, or at least 15 GSM. In another embodiment, the fibers can have a fiber weight not greater than 500 GSM, such as not greater than 450 GSM, not greater than 400 GSM, not greater than 350 GSM, or not greater than 300 GSM. The fibers of the nonwoven substrate material can have a fiber weight that is within a range of any minimum or maximum value noted above. In a specific embodiment, the fibers have a fiber weight of at least 1 GSM and not greater than 500 GSM, such as at least 15 GSM and not greater than 300 GSM.

In accordance with an embodiment, the nonwoven substrate material can include one or more binders to adhere and interlock the fibers of the nonwoven web to each other. In a particular embodiment, the binder can include natural or synthetic rubber latex, an acrylic latex, a melamine formaldehyde resin, a phenolic resin, a polyurethane resin, or a combination thereof. In certain embodiments, the nonwoven substrate material may be cured and complete prior to application of additional materials/substances.

In certain embodiments, the nonwoven substrate can be a compressed nonwoven web of fibers. In certain embodiments, the nonwoven substrate can be compressed with a compression ratio of at least about 10% to not greater than about 95%. The compression rate defined as the difference of the thicknesses of the uncompressed and the compressed article divided by the thickness of the uncompressed article. In other embodiments, the compression ratio is at least about 20%, at least about 50%, or at least about 90%.

For the purposes of this disclosure, the terms "nonwoven substrate" and "nonwoven web of fibers" may be synonymous.

Abrasive Composition

In an embodiment, an abrasive composition is disposed on or within the nonwoven web, wherein the abrasive composition is adhered to the fibers. The abrasive composition comprises a polymeric binder composition and abrasive aggregates disposed in contact with (i.e., disposed on and/or disposed in) the polymeric binder composition. Optionally, the abrasive composition can contain a filler, such as a mineral filler.

The amount of the polymeric binder in the abrasive composition can vary. In an embodiment, the polymeric binder comprises at least 5 wt % of the abrasive composition, such as at least 10 wt %, at least 15 wt %, or at least 20 wt %. In another embodiment, the polymeric binder comprises not greater than 60 wt % of the abrasive composition, such as not greater than 55 wt %, not greater than 50 wt %, or not greater than 45 wt %. The amount of the polymeric binder can be within a range of any minimum or maximum value noted above. In a specific embodiment, the amount of the polymeric binder comprises from at least at least 5 wt % to not greater than 60 wt % of the abrasive composition.

The amount of the abrasive aggregates in the abrasive composition can vary. In an embodiment, the abrasive aggregates comprises at least 15 wt % of the abrasive composition, such as at least 20 wt %, at least 25 wt %, or at least 30 wt %. In another embodiment, the abrasive aggregates comprises not greater than 80 wt % of the abrasive composition, such as not greater than 75 wt %, not greater than 70 wt %, or not greater than 65 wt %. The amount of the abrasive aggregates can be within a range of any minimum or maximum value noted above. In a specific embodiment, the amount of the abrasive aggregates comprises from at least at least 15 wt % to not greater than 80 wt % of the abrasive composition.

The amount of the filler in the abrasive composition can vary. In an embodiment, the filler comprises no filler (i.e., 0 wt % of the abrasive composition). In another embodiment, filler is present comprises at least 0.5 wt % of the abrasive composition, such as at least 1 wt %, at least 5 wt %, or at least 10 wt %. In another embodiment, the filler comprises not greater than 30 wt % of the abrasive composition, such as not greater than 25 wt %, not greater than 20 wt %, or not greater than 15 wt %. The amount of the filler can be within a range of any minimum or maximum value noted above. In a specific embodiment, the amount of the filler comprises from at least at least 0 wt % to not greater than 30 wt % of the abrasive composition.

Binder Composition

In an embodiment, the binder composition (also called herein a "make resin" or "make coat") comprises a polymeric binder composition. The polymeric binder composition can include a variety of organic polymers depending on the desired application. In an embodiment, the polymeric binder composition can comprise a polyvinylpyrrolidone, a polyacrylic acid, a polyacrylate, a polymethacrylic acid, a polymethacrylate, a polystyrene, a polyvinyl alcohol, a polyvinyl acetate, a polyacrylamide, a cellulose, a polyether, a phenolic resin, a melamine resin, a polyurethane, a polyurea, a polyester, a phenoxy, a latex, a fluorinated polymer, a chlorinated polymer, a siloxane, a silyl compound, a silane, a blend thereof, or any combination thereof. In another embodiment, the polymeric binder composition can comprise an epoxy, a polysulfide, a polyurethane, a phenolic, a polyester, a polyvinyl butyral, a polyolefin, a vinyl ester, a blend thereof, or an combination thereof. In certain embodiments, the nonwoven substrate can include a plurality of polymeric binders in a single layer or multiple layers that adhere (i.e., bond, couple) the abrasive aggregates to the nonwoven web of fibers. In a specific embodiment, the polymeric binder composition comprises a polyurethane, such as an imide cross-linked urethane component.

Fillers and Additives

The polymeric binder composition can optionally include one or more additives. Additives can include fillers (active or passive), plasticizers, surfactants, lubricants, colorants (e.g., pigments), bactericides, fungicides, grinding aids, and antistatic agents. In an embodiment, the polymeric binder composition comprises a total amount of additives ranging from 0 wt % to 30 wt % of the abrasive composition.

Abrasive Aggregates

In an embodiment, a plurality of abrasive aggregates is disposed on or in the polymeric binder composition, wherein each abrasive aggregate comprises a vitreous binder composition and a plurality of silicon carbide abrasive grit particles bonded together by the vitreous binder.

The amount of the vitreous binder in an abrasive aggregate can vary. In an embodiment, the vitreous binder comprises at least 1 wt % of the abrasive aggregate, such as at least 2 wt %, at least 3 wt %, at least 4 wt %, at least 5 wt %, at least 7 wt %, or at least 10 wt %. In another embodiment, the vitreous binder comprises not greater than 60 wt % of the abrasive aggregate, such as not greater than 55 wt %, not greater than 50 wt %, or not greater than 45 wt %. The amount of the vitreous binder can be within a range of any minimum or maximum value noted above. In a specific embodiment, the amount of the vitreous binder comprises from at least at least 1 wt % to not greater than 60 wt % of the abrasive aggregate.

The amount of the abrasive grit particles in an abrasive aggregate can vary. In an embodiment, the abrasive grit particles comprises at least 40 wt % of the abrasive aggregate, such as at least 45 wt %, at least 50 wt %, or at least 55 wt %. In another embodiment, the abrasive grit particles comprises not greater than 99 wt % of the abrasive aggregate, such as not greater than 98 wt %, not greater than 97 wt %, or not greater than 96 wt %. The amount of the abrasive grit particles can be within a range of any minimum or maximum value noted above. In a specific embodiment, the amount of the abrasive grit particles comprises from at least at least 40 wt % to not greater than 99 wt % of the abrasive aggregate.

Abrasive Grit Particles

In an embodiment the abrasive grit particles comprise silicon carbide particles (also referred to herein as "silicon carbide"). The silicon carbide can be monocrystalline, polycrystalline, or a combination thereof. The silicon carbide can be natural silicon carbide (also known as moissanite), synthetic silicon carbide, metal coated silicon carbide, resin coated silicon carbide, or any combination thereof.

Grit Particle Size

The silicon carbide grit particles can be in a particular size range, conform to a particular size distribution, or a combination thereof. In an embodiment, the silicon carbide grit particles may be in a size range of not less than 1 micron and not greater than 2000 microns. In a particular embodiment, the silicon carbide grit particles are in a size range from 50 microns to 200 microns.

Vitreous Binder Composition

The abrasive aggregate includes a vitreous binder composition (also referred to herein as a glass binder composition, glass bond composition, or glass bond). The vitreous binder composition is a glass composition that can comprise acidic oxides, amphoteric oxides, alkali oxides, neutral oxides, or a combination thereof. Acidic oxides are oxides having the general formula RO or $RO_2$, where R is a metal or transition metal moiety. Acidic oxides can include silicon dioxide (silica) ($SiO_2$), manganese (IV) oxide ($MnO_2$), molybdenum trioxide (molybdite) ($MoO_3$), phosphorus pentoxide ($P_2O_5$), titanium dioxide (titania) ($TiO_2$), vanadium (V) oxide ($V_2O_5$), and zirconium dioxide ($ZrO_2$), or combinations thereof. Alkali (also known as "basic oxides" or "flux") are oxides having the formula RxO, where R is a metal or transition metal moiety. In an embodiment, alkali oxides can include cobalt (II) oxide (CoO), copper (II) oxide (cupric oxide)(CuO), nickel (II) oxide (NiO), strontium oxide (strontia) (SrO), magnesium oxide (magnesia) (MgO), calcium oxide (calcia) (CaO), lithium oxide (lithia) ($Li_2O$), barium oxide (baria) (BaO), zinc oxide (calamine)(ZnO), sodium oxide ($Na_2O$), potassium oxide (potash) ($K_2O$), and combinations thereof. Amphoteric oxides are oxides having the general formula $R_2O_3$, where R is a metal or transition metal moiety. In an embodiment, amphoteric species can include boron trioxide (boria) ($B_2O_3$), chromium (III) oxide (chromia) ($Cr_2O_3$), yttrium (III) oxide (yttria) ($Y_2O_3$), iron (III) oxide ($Fe_2O_3$), and aluminum oxide (alumina) ($Al_2O_3$), and combinations thereof. The amount of acidic oxides, basic oxides and amphoteric oxides in the vitreous binder composition can vary. In an embodiment, based on the weight of the vitreous binder composition, the vitreous binder composition comprises about 40 wt % to 65 wt % of total combined acid oxides. In an embodiment, based on the weight of the vitreous binder composition, the vitreous binder composition comprises about 15 wt % to 30 wt % of total combined amphoteric oxides. In an embodiment, based on the weight of the vitreous binder composition, the vitreous binder composition comprises about 15 wt % to 25 wt % total combined basic oxides and neutral oxides. In an embodiment, the vitreous binder composition comprises a combination of any of the above ranges.

In an embodiment, based on the weight of the vitreous binder composition, the amount of silicon dioxide can be not less than 20 wt %, such as not less than about 25 wt %, not less than about 30 wt %, not less than about 35 wt %, not less than 40 wt %, or not less than about 45 wt %. In another embodiment, based on the weight of the vitreous binder composition, the amount of silicon dioxide can be not greater than 80 wt %, such as not greater than 75 wt %, not greater than 70 wt %, or not greater than 65 wt %. The amount of silicon dioxide can be within a range comprising any pair of the previous upper and lower limits. In a particular embodiment, based on the weight of the vitreous binder composition, the amount of silicon dioxide can be in a range of not less than 20 wt % to not greater than 80 wt %, such as 25 wt % to 75 wt %, or 30 wt % to 70 wt %. In a specific embodiment, based on the weight of the vitreous binder composition, the amount of silicon dioxide can be 20 wt % to 70 wt %, such as 20 wt % to 45 wt %, or 45 wt % to 70 wt %.

In an embodiment, based on the weight of the vitreous binder composition, the amount of boron trioxide can be not less than 1 wt %, such as not less than about 2 wt %, not less than about 3 wt %, not less than about 4 wt %, or not less than about 5 wt %. In another embodiment, based on the weight of the vitreous binder composition, the amount of boron trioxide can be not greater than 50 wt %, such as not greater than 45 wt %, not greater than 40 wt %, or not greater than 35 wt %. The amount of boron trioxide can be within a range comprising any pair of the previous upper and lower limits. In a particular embodiment, based on the weight of the vitreous binder composition, the amount of boron trioxide can be in a range of not less than 1 wt % to not greater than 50 wt %, such as 5 wt % to 40 wt %.

The vitreous binder composition can possess a particular amount of transition metal, which can vary. In an embodiment, based on the weight of the vitreous binder composition, the vitreous binder composition can comprises not less than 1 wt % and not greater than 15 wt % of transition metal.

The vitreous binder composition can have a particular glass transition temperature, sintering temperature, or combination thereof. In an embodiment, the vitreous binder composition has a sintering temperature (Ts) in a range of 550° C. to 1200° C., such as from 650° C. to 1000° C. In a specific embodiment, the sintering temperature in a range of 700° C. to 800° C. In another specific embodiment, the sintering temperature is in a range of 800° C. to 900° C. In another specific embodiment, the sintering temperature is in a range of 900° C. to 1000° C., such as from 900° C. to 930° C., such as from 930° C. to 970° C. In an embodiment, the vitreous binder composition has a glass transition temperature (Tg) in a range of 490° C. to 700° C.

The vitreous binder composition can comprise bubbles dispersed in the vitreous binder at the interface of the vitreous binder and the silicon carbide grit particles.

Abrasive Aggregate Properties

The abrasive aggregates can possess one or more beneficial and characteristic properties.

Loose Pack Density

The abrasive aggregates can have a beneficial loose packed density in a particular range. In an embodiment, the loose pack density is at least 0.5 g/cm$^3$, such as at least 0.75 g/cm$^3$, at least 1 g/cm$^3$, or at least 1.5 g/cm$^3$. In another embodiment, the loose pack density is not greater than 3.5 g/cm$^3$, such as not greater than 3.25 g/cm$^3$, not greater than 3 g/cm$^3$, or not greater than 2.75 g/cm$^3$. The amount of the loose pack density can be within a range of any minimum or maximum value noted above. In a specific embodiment, the amount of the loose pack density is at least 0.5 g/cm$^3$ to not greater than 3.5 g/cm$^3$.

Porosity

The abrasive aggregates can have a beneficial porosity in a particular range. In an embodiment, the porosity is at least 5 vol %, such as at least 10 vol %, at least 15 vol %, or at least 20 vol %. In another embodiment, the porosity is not greater than 85 vol %, such as not greater than 80 vol %, not greater than 75 vol %, or not greater than 70 vol %. The amount of the porosity can be within a range of any minimum or maximum value noted above. In a specific embodiment, the amount of the porosity is at least 5 vol % to not greater than 85 vol %.

Crush Strength

The abrasive aggregate can have a beneficial crush strength (represented by a crush % where a higher crush % indicates a more friable aggregate and a lower crush % indicates a less friable aggregate) in a particular range. The crush strength can be measured at a particular sieve mesh size (−30/+120), such as (−20/+100), such as (−20/+70), such as (−40/+60), such as (−35/+45), or the like at a load of 5 MPa. In an embodiment, the abrasive aggregates have a crush % of not greater than 90%, such as not greater than 85%, not greater than 80%, not greater than 75%, not greater than 70%, not greater than 65%, not greater than 60%, not greater than 55%, not greater than 50%, not greater than 45%, not greater than 40%, or not even greater than 35%.

Abrasive Aggregate Size

The abrasive aggregates can be in a particular size range, conform to a particular size distribution, or a combination thereof. In an embodiment, the abrasive aggregate can be in a range of not less than 1 micron to not greater than 4000 microns.

Method of Making an Abrasive Aggregate

In general, the aggregate can be made by providing an aggregate forming mixture, processing the aggregate forming mixture into an aggregate precursor, and processing the aggregate precursor into the aggregate.

Forming an aggregate forming mixture includes mixing together a plurality of abrasive particles, a vitreous binder composition, and a temporary organic binder to form a mixture, wherein the abrasive particles are silicon carbide. This activity can be accomplished by combining one or more glass frit powders that contain the desired combination of oxides with silicon carbide. The mixing can be done wet (aqueous) or dry. In an embodiment, the mixing is performed with the aid of an aqueous solution of temporary organic binder that allows the glass powder and silicon carbide mixture to be shaped, such as polyethylene glycol, or other organic temporary binders known in the art. Adequate mixing of the vitreous binder composition can be accomplished by any known suitable methods. The ingredients are mixed together until uniform, such as by using a mortar and pestle, automated tumbler, an automated grinder/mixer, or other suitable manner until uniform.

Processing the aggregate forming mixture into an aggregate precursor includes shaping the mixture to form a plurality of abrasive aggregate precursor granules by passing the mixture through a screen with a desired hole size. Shaping of the mixture to form a plurality of abrasive aggregate precursor granules is not limited to screening and may be accomplished by any means suitable for shaping a wet mixture into granules and may include shaping by pressing, sieving, extruding, segmenting, casting, stamping, cutting, or a combination thereof.

Processing the aggregate precursor into an abrasive aggregate includes drying the wet aggregates precursor granules in an oven or on an infrared table. Drying can be performed at temperatures below the expected curing temperature, such as at ambient temperature, to remove water from the mixture but leave the aggregate precursor granules unsintered. Dried aggregate precursor granules can be stored for later usage. The dried aggregate precursor granules can then be sintered prior to being used or incorporated into a fixed abrasive article.

Sintering includes heating the dry green aggregate precursor granules at the required temperature for a given glass bond. Sintering of the aggregate precursor granules can be accomplished by any known suitable methods. Sintering can be done under pressure or at ambient pressure. The sintering atmosphere can be a reducing atmosphere if desired. In an embodiment, the aggregate precursor granules may be fired with graphite powder to prevent oxidation. In embodiments, the heat can be ramped up in intervals, followed by a heat soak at a desired temperature or temperatures for a desired period of time, followed by a cool down period. In an embodiment, the sintering is accomplished by ramping a heating device at 100 degrees Celsius per hour, soaking the aggregate precursor granules at the required temperature for an hour, and cooling down the aggregate precursor granules. In another embodiment, the precursor granules are disposed on a graphite sheet during the sintering process.

Further processing can include crushing to break up any large masses of the sintered material and sieving the sintered material to obtain abrasive aggregates in a desired particle size range. In an embodiment, the abrasive aggregates can be crushed by roller crushing, which produces beneficial fracturing properties.

Completed abrasive aggregates can be used as loose abrasives (e.g., in an abrasive slurry or as blast media) or incorporated into fixed abrasives. Fixed abrasives include bonded abrasives, coated abrasives, nonwoven abrasives, engineered abrasives (also called structured abrasives), and combinations thereof. In specific embodiments, completed abrasive aggregates can be incorporated into nonwoven abrasive wheels.

Making a Nonwoven Abrasive Article

In an embodiment, an abrasive article can be formed by coating a substrate material with a binder formulation, depositing abrasive grains to contact the binder formulation, and curing the binder formulation. In a particular embodiment, the substrate includes a nonwoven fibrous material. The nonwoven fibrous material can be formed by randomly depositing fibers over a carrier and coating the fibers with an adhesive. The adhesive, such as an acrylic, urethane, vinyl acetate adhesive, or the like, secures the fibers together forming a lofty nonwoven fibrous material. Optionally, the fibrous material can be secured to a support layer. In another embodiment, the fibrous material can be cut into slabs for further treatment.

Coating the Substrate Material; In an embodiment, the nonwoven fibrous material can be coated with a polymeric binder formulation, such as through spray coating, dip coating, soaking, or any combination thereof. Excess polymeric binder formulation can be drained and/or wiped from the nonwoven fibrous material.

Disposing Abrasive Aggregates; In an embodiment, abrasive aggregates can be deposited to contact the polymeric binder formulation. In another embodiment, the abrasive aggregates can be deposited following coating of the polymeric binder formulation on the nonwoven fibrous material. In another embodiment, a slurry can be formed of the polymeric binder formulation and abrasive aggregates, and the slurry coated onto the nonwoven fibrous material. In such an instance, depositing the abrasive aggregates and coating the polymeric binder formulation occurs simultaneously. In another embodiment, the abrasive aggregates can be deposited before coating with the polymeric binder formulation.

Curing the Binder; In an embodiment, after the abrasive grains are disposed in contact with the polymeric binder formulation, the polymeric binder formulation can be cured.

Applying Additional Coatings—e.g., A Size coating; In an embodiment, the nonwoven fibrous material can be coated with one or more subsequent polymeric binder formulation following application of the abrasive grains, such as a size coat, and/or supersize coat. In an embodiment, the same polymeric formulation used to form the make coat can be applied to form a size coat relative to the abrasive grains. In another embodiment, a different polymeric formulation is used to form the size coat. Optionally, a further polymeric formulation can be applied over the size coat as a super size coat.

The coated fibrous material can be cut or shaped to form the abrasive product. For example, the coated fibrous material can be cut into a circular shape to form a wheel. In another example, the fibrous material can be stacked to form a multilayer product or wound into a convolute wheel. In another example, the coated fibrous material can be cut into flaps that are assembled to form the abrasive product. In an embodiment, unified wheels can be formed stacking 4 plys of coated sheets and placing them between two metal plates, and curing in an oven. In an embodiment, cutting of the cured stacks can occur to form the unified wheel.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiments Listing

Embodiment 1. An abrasive article comprising:
a substrate comprising a nonwoven web of lofty fibers; and
an abrasive composition disposed on and within the nonwoven web,
wherein the abrasive composition is adhered to the fibers and comprises a polymeric binder composition and a plurality of abrasive aggregates dispersed in the polymeric binder composition, and
wherein an aggregate of the plurality of abrasive aggregates comprises
a vitreous binder composition and a plurality of silicon carbide abrasive grit particles dispersed in the vitreous binder, and
wherein the vitreous binder composition comprises a sintering temperature (Ts) in a range of 700° C. to 1100° C.

Embodiment 2. The abrasive article of embodiment 1, wherein the vitreous binder composition comprises not less than 1 wt % and not greater than 60 wt % of the weight of the abrasive aggregate.

Embodiment 3. The abrasive article of embodiment 1, wherein the abrasive grit particles comprise not less than 40 wt % and not greater than 99 wt % of the weight of the abrasive aggregate.

Embodiment 4. The abrasive article of embodiment 1, wherein the vitreous binder composition has a sintering temperature (Ts) in a range of 800° C. to 1000° C., such as 825° C. to 975° C.

Embodiment 5. The abrasive article of embodiment 1, wherein the vitreous binder composition further comprises a glass transition temperature (Tg) in a range of 490° C. to 900° C., such as 500° C. to 800° C.

Embodiment 6. The abrasive article of embodiment 1, wherein the vitreous binder composition comprises not less than 1 wt % and not greater than 15 wt % of a transition metal.

Embodiment 7. The abrasive article of embodiment 1, wherein the vitreous binder composition comprises about 40 wt % to 65 wt % of acid oxides.

Embodiment 8. The abrasive article of embodiment 7, wherein the vitreous binder composition comprises about 15 wt % to 30 wt % of amphoteric oxides.

Embodiment 9. The abrasive article of embodiment 8, wherein the vitreous binder composition comprises, about 15 wt % to 25 wt % combined base oxides and neutral oxides Embodiment 10. The abrasive article of embodiment 1, wherein the abrasive aggregate comprises bubbles dispersed in the vitreous binder at the interface of the vitreous binder and the silicon carbide grit particles.

Embodiment 11. The abrasive article of embodiment 1, wherein the abrasive aggregate has a loose packed density in a range of not less than 0.5 g/cm3 to not greater than 3.5 g/cm3.

Embodiment 12. The abrasive article of embodiment 1, wherein the abrasive aggregate has a porosity in a range of 5% to 85% as measured by mercury porosimetry.

Embodiment 13. The abrasive article of embodiment 1, wherein the silicon carbide grit particles are in a size range of not less than 1 micron and not greater than 2000 microns.

Embodiment 14. The abrasive article of embodiment 1, wherein the abrasive aggregates have a size in a range of not less than 10] microns and not greater than 4000 microns.

Embodiment 15. The abrasive article of embodiment 1, wherein the nonwoven web comprises a fiber weight in a range of not less than 1 g/m2 and not greater than 500 g/m2.

Embodiment 16. The abrasive article of embodiment 1, wherein the nonwoven web comprises fibers having a density ranging from not less than 5 denier to not greater than 100 denier.

Embodiment 17. The abrasive article of embodiment 16, wherein the nonwoven web comprises 50 wt % to 100 wt % of a first fiber and 0 wt % to 50 wt % of a second fiber, such as up to 50 wt % of a first fiber and up to 50 wt % of a second fiber, such as not less than 70% of a first fiber and not greater than 30% of a second fiber.

Embodiment 18. The abrasive article of embodiment 17, wherein the nonwoven web comprises about 70 wt % of 60 denier fiber and about 30 wt % of 15 denier fiber.

Embodiment 19. The abrasive article of embodiment 1, wherein the polymeric binder composition comprises from 5.0 wt % to 60.0 wt % of the abrasive composition.

Embodiment 20. The abrasive article of embodiment 1, wherein the plurality of abrasive aggregates comprises from 15 wt % to 80.0 wt % of the abrasive composition.

Embodiment 21. The abrasive article of embodiment 1, wherein the abrasive composition further comprises a filler in an amount ranging from 0 wt % to 30.0 wt % of the abrasive composition.

Embodiment 22. The abrasive article of embodiment 1, wherein the abrasive composition comprises from 50 wt % to 99 wt % of the abrasive article.

Embodiment 23. The abrasive article of embodiment 1, wherein the nonwoven web comprises from 1 wt % to 50 wt % of the abrasive article.

Embodiment 24. The abrasive aggregate of embodiment 1, wherein the silicon carbide abrasive grit particles comprise not less than 15 wt % and not greater than 99 wt % of the weight of the abrasive aggregate.

Embodiment 25. An abrasive article comprising:
a substrate comprising a nonwoven web of lofty fibers; and
an abrasive composition disposed on and within the nonwoven web,
wherein the abrasive composition is adhered to the fibers and comprises a polymeric binder composition and a plurality of abrasive aggregates dispersed in the polymeric binder composition, and
wherein an aggregate of the plurality of abrasive aggregates comprises a vitreous binder composition and a plurality of silicon carbide abrasive grit particles dispersed in the vitreous binder, and
wherein the vitreous binder composition comprises a sintering temperature (Ts) in a range of 700° C. to 1100° C.

Embodiment 26. The abrasive article of embodiment 25, wherein the vitreous binder composition comprises not less than 1 wt % and not greater than 60 wt % of the weight of the abrasive aggregate, and
wherein the abrasive grit particles comprise not less than 40 wt % and not greater than 99 wt % of the weight of the abrasive aggregate.

Embodiment 27. The abrasive article of embodiment 25, wherein the vitreous binder composition has a sintering temperature (Ts) in a range of 800° C. to 1000° C.

Embodiment 28. The abrasive article of embodiment 25, wherein the vitreous binder composition further comprises a glass transition temperature (Tg) in a range of 490° C. to 900° C.

Embodiment 29. The abrasive article of embodiment 25, wherein the vitreous binder composition comprises not less than 1 wt % and not greater than 15 wt % of a transition metal.

Embodiment 30. The abrasive article of embodiment 25, wherein the vitreous binder composition comprises
about 40 wt % to 65 wt % of acid oxides,
about 15 wt % to 30 wt % of amphoteric oxides, and
about 15 wt % to 30 wt % of amphoteric oxides.

Embodiment 31. The abrasive article of embodiment 25, wherein the abrasive aggregate comprises bubbles dispersed in the vitreous binder at the interface of the vitreous binder and the silicon carbide grit particles.

Embodiment 32. The abrasive article of embodiment 25, wherein the abrasive aggregate has a loose packed density in a range of not less than 0.5 g/cm$^3$ to not greater than 3.5 g/cm$^3$.

Embodiment 33. The abrasive article of embodiment 25, wherein the abrasive aggregate has a porosity in a range of 5% to 85% as measured by mercury porosimetry.

Embodiment 34. The abrasive article of embodiment 25, wherein the silicon carbide grit particles are in a size range of not less than 1 micron and not greater than 2000 microns.

Embodiment 35. The abrasive article of embodiment 25, wherein the abrasive aggregates have a size in a range of not less than 10 microns and not greater than 4000 microns.

Embodiment 36. The abrasive article of embodiment 25, wherein the nonwoven web comprises a fiber weight in a range of not less than 1 g/m$^2$ and not greater than 500 g/m$^2$.

Embodiment 37. The abrasive article of embodiment 25, wherein the nonwoven web comprises fibers having a density ranging from not less than 5 denier to not greater than 100 denier.

Embodiment 38. The abrasive article of embodiment 37, wherein the nonwoven web comprises 50 wt % to 100 wt % of a first fiber and 0 wt % to 50 wt % of a second fiber.

Embodiment 39. The abrasive article of embodiment 38, wherein the nonwoven web comprises about 50 wt % to 70 wt % of a 60 denier fiber and about 30 wt % to 50 wt % of a 15 denier fiber.

Embodiment 40. The abrasive article of embodiment 25, wherein the abrasive composition comprises from 5.0 wt % to 60.0 wt % polymeric composition.

Embodiment 41. The abrasive article of embodiment 25, wherein the abrasive composition comprises from 15 wt % to 80.0 wt % abrasive aggregates.

Embodiment 42. The abrasive article of embodiment 25, wherein the abrasive composition further comprises a filler in an amount ranging from 0 wt % to 30.0 wt % of the abrasive composition.

Embodiment 43. The abrasive article of embodiment 25, wherein the abrasive article comprises from 50 wt % to 99 wt % abrasive composition.

Embodiment 44. The abrasive article of embodiment 25, wherein the nonwoven web comprises from 1 wt % to 50 wt % of the abrasive article.

EXAMPLES

The properties and advantage of the present disclosure are illustrated in further detail in the following nonlimiting examples. Unless otherwise indicated, temperatures are expressed in degrees Celsius, pressure is ambient, and concentrations are expressed in weight percentages.

Components Listing

DX200 glass frit (available from Saint-Gobain Bonded Abrasives, Worcester, Mass., USA).

S3 glass frit (available from Saint-Gobain Bonded Abrasives, Worcester, Mass., USA).

MJ9 glass frit (available from Saint-Gobain Bonded Abrasives, Worcester, Mass., USA).

MJ12 glass frit (available from Saint-Gobain Bonded Abrasives, Worcester, Mass., USA).

SIKA® F180 silicon carbide grit particles (available from Saint-Gobain Silicon Carbide, Les Miroirs, France, a division of Saint-Gobain Ceramic Materials).

Blk F100 and F80 silicon carbide grit particles, (commonly commercially available)

AR30 animal glue (available from Olympic Adhesives, Inc.).

Dextrin (commonly commercially available).

Example 1—Preparation of Samples S1-S4

Inventive samples abrasive aggregates (S1-S4) having different types and amounts of glass bond and silicon carbide grit particles were prepared using the materials and amounts listed in Table 1.

TABLE 1

| | Abrasive Aggregate Compositions S1-S4 | | | | | | | | | | | |
|---|---|---|---|---|---|---|---|---|---|---|---|---|
| | S1 Wet wt % | S1 Dry wt % | S1 Fired wt % | S2 Wet wt % | S2 Dry wt % | S2 Fired wt % | S3 Wet wt % | S3 Dry wt % | S3 Fired wt % | S4 Wet wt % | S4 Dry wt % | S4 Fired wt % |
| SIKA F180 | 84.6 | 88.4 | 96.1 | 84.0 | 88.4 | 96.1 | 88.7 | 92.2 | 96.0 | 88.7 | 92.2 | 96 |
| MJ9 | 3.5 | 3.6 | 3.93 | — | — | — | — | — | — | 3.7 | 3.8 | 4.0 |

TABLE 1-continued

| | S1 Wet wt % | S1 Dry wt % | S1 Fired wt % | S2 Wet wt % | S2 Dry wt % | S2 Fired wt % | S3 Wet wt % | S3 Dry wt % | S3 Fired wt % | S4 Wet wt % | S4 Dry wt % | S4 Fired wt % |
|---|---|---|---|---|---|---|---|---|---|---|---|---|
| S3 | — | — | — | 3.4 | 3.6 | 3.9 | 3.7 | 3.8 | 4.0 | — | — | — |
| Dextrin | 7.7 | 8.0 | — | 7.6 | 8.0 | — | 3.8 | 4.0 | — | 3.8 | 4.0 | — |
| Water | 4.2 | — | — | 5.0 | — | — | — | — | — | 3.8 | — | — |
| Total | 100.0 | 100.0 | 100.0 | 100.0 | 100.0 | 100.0 | 100.0 | 100.0 | 100.0 | 100.0 | 100.0 | 100.0 |

Samples 1-4 were prepared according to the following method:

Aggregates of silicon carbide F180 grit were formed with a Quadro Comil conical mill with a mesh having hole openings of 24 mil (610 μm). The green (unfired) aggregates were collected in metal pans and oven dried. The dry green aggregates were loaded in ceramic saggers and fired at 915° C. for the MJ9 bond aggregates and at 950° C. for the S3 bond aggregates. The fired aggregates were hand crushed first then crushed by two-roller crusher. The crushed aggregates were sieved with U.S. standard Mesh 30 and 140 to collect aggregate product. For S1 and S2, the particle size of aggregate products ranged from 106 μm (mesh 140) to 600 μm (mesh 30). For S3 and S4, the particle size of aggregate products ranged from 112 μm (mesh 120) to 500 μm (mesh 35). Loose pack density (LPD) of aggregates was measured with an LPD tester. To determine loose pack density, the fired aggregate is poured through a funnel in a 100 cc cup. Any excess material is removed with a blade and the cup is weighed. The loose pack density is equal to the weight divided by the cup volume. Crush tests were conducted on aggregate size between mesh 40 and 60 under a pressure of 5 MPa. Table 2 below summarizes the results.

TABLE 2

Abrasive Aggregates S1-S4 Crush Measurements

| Grain ID | Grit | Glass Bond wt % | Bond Type | Firing Temp. ° C. | Organic Binder wt % | Water wt % | Product Size Cut | LPD g/cm³ | Crush % |
|---|---|---|---|---|---|---|---|---|---|
| S1 | F180 | 3.9 | MJ9 | 915 | 8 Dex | 4.2 | 30/140 | 0.96 | 84 |
| S2 | F180 | 3.9 | S3 | 950 | 8 Dex | 5.0 | 30/140 | 1.00 | 66 |
| S4 | F180 | 4 | MJ9 | 915 | 4 Dex | 3.8 | 35/120 | 0.84 | 86 |
| S3 | F180 | 4 | S3 | 950 | 4 Dex | 3.8 | 35/120 | 0.95 | 65 |

From the crush % data in Table 2, it is shown that aggregates with S3 bond are stronger than with MJ9 bond under the same concentrations.

Particle size distributions (PSD) of S3 and MJ9 bonded SiC F180 aggregates with size cut between mesh 30 and 140 are shown in FIG. 7. There is no significant difference in PSD between the S3 and MJ9 bonded aggregates.

Example 2—Preparation of Samples S5-S6

Samples abrasive aggregates (S5-S6) having different types and amounts of glass bond were prepared using the materials and amounts listed in Table 3. Samples S4 and S5 were prepared and tested the same as aggregates S1-S4, above in Example 1, except that different amounts of components were utilized.

TABLE 3

Abrasive Aggregates S5-S6

| | S5 Wet wt % | S5 Dry wt % | S5 Fired wt % | S6 Wet wt % | S6 Dry wt % | S6 Fired wt % |
|---|---|---|---|---|---|---|
| Blk SiC | 88.9 | 92.4 | 96.0 | 88.9 | 92.4 | 96.0 |
| F100 | | | | | | |
| MJ9 | 3.7 | 3.8 | 4.0 | — | — | — |
| MJ12 | — | — | — | 3.7 | 3.8 | 4.0 |
| Dextrin | 1.8 | 1.9 | — | 1.8 | 1.9 | — |
| AR30 | 4.6 | 1.9 | — | 4.6 | 1.9 | — |
| Water | 1.0 | — | — | 1.0 | — | — |
| Total | 100.0 | 100.0 | 100.0 | 100.0 | 100.0 | 100.0 |

TABLE 4

Abrasive Aggregates S5-S6 Crush Measurements

| Grain ID | Grit | Bond Type | Firing Temp. ° C. | Product Size Cut | LPD g/cm³ | Crush % |
|---|---|---|---|---|---|---|
| S5 | F100 | MJ9 | 915 | 20/100 | 1.17 | 63 |
| S6 | F100 | MJ12 | 915 | 20/100 | 1.21 | 68 |

The aggregates were formed with Quadro mesh 7C039 screen, which has hole opening of 39 mil (990 μm). The wet aggregates were collected in metal pans and oven dried. The oven dried green aggregates were loaded in ceramic saggers and fired at 915° C. The fired aggregates were hand crushed first to break up the cake, then crushed by roll crushers. The crushed aggregates were sieved with U.S. standard Mesh 20 and 100 to collect aggregate product. Table 4 showed that LPD of MJ 9 bonded SiC F100 aggregates was 1.17 and crush % was 63%. MJ12 bond aggregates had an LPD of 1.21 and 68% crush. Therefore, the aggregates with MJ9 and MJ12 bonds had similar LPD and crush strength.

Example 3—Preparation of Samples S7-S10

Samples abrasive aggregates (S7-S10) having different types and amounts of glass bond were prepared using the materials and amounts listed in Table 5. Samples S7-S10 were prepared the same as S1-S6, above in Examples 1 and 2, except that different amounts of components were utilized, including the glass bond.

TABLE 5

Abrasive Aggregates S7-S10

| | S7 Wet wt % | S7 Dry wt % | S7 Fired wt % | S8 Wet wt % | S8 Dry wt % | S8 Fired wt % | S9 Wet wt % | S9 Dry wt % | S9 Fired wt % | S10 Wet wt % | S10 Dry wt % | S10 Fired wt % |
|---|---|---|---|---|---|---|---|---|---|---|---|---|
| Blk SiC 5400 F100 | 88.7 | 92.1 | 95.8 | — | — | — | 88.8 | 92.3 | 95.9 | — | — | — |
| Blk SiC 5400 F80 | — | — | — | 88.8 | 92.3 | 95.9 | — | — | — | 88.8 | 92.3 | 95.1 |
| DX200 | 3.9 | 4.1 | 4.2 | 3.8 | 3.9 | 4.1 | — | — | — | — | — | — |
| S3 | — | — | — | — | — | — | 3.8 | 3.9 | 4.1 | 3.8 | 3.9 | 4.1 |
| Dextrin | 1.8 | 1.9 | — | 1.8 | 1.9 | — | 1.8 | 1.9 | — | 1.8 | 1.9 | — |
| AR30 | 4.6 | 1.9 | — | 4.6 | 1.9 | — | 4.6 | 1.9 | — | 4.6 | 1.9 | — |
| Water | 1.0 | — | — | 1.0 | — | — | 1.0 | — | — | 1.0 | — | — |
| Total | 100.0 | 100.0 | 100.0 | 100.0 | 100.0 | 100.0 | 100.0 | 100.0 | 100.0 | 100.0 | 100.0 | 100.0 |

TABLE 6

Abrasive Aggregates S7-S10 Crush Measurements

| | Grit | Bond Type | Firing Temp. ° C. | Product Size Cut | LPD | Crush % |
|---|---|---|---|---|---|---|
| S7 | F100 | DX200 | 750 | 20/100 | 1.24 | 59 |
| S9 | F100 | S3 | 950 | 20/100 | 1.26 | 60 |
| S8 | F80 | DX200 | 750 | 20/70 | 1.23 | 44 |
| S10 | F80 | S3 | 950 | 20/70 | 1.21 | 39 |

Aggregates of SiC F80 and F100 grit were prepared using DX200 and S3 vitreous bond. Table 6 shows the formulations of grit, vitreous bond, organic binders, and water. The aggregates of Table 5 were formed with a Quadro Comil conical screen. The green (unfired) aggregates were collected in metal pans and oven dried. The dry green aggregates were loaded in ceramic saggers and fired at 750° C. for DX200 bond and 950° C. for S3 bond. The fired aggregates were hand crushed first, then crushed by a two-roller crusher. The crushed aggregates were sieved and collected at a final aggregate size cut of mesh 20/100 (0.15-0.85 mm) for the aggregates that included F100 grit and mesh 20/70 (0.21-0.85 mm) for the aggregates that included F80 grit. Crush tests were conducted on mesh 40/60 size cut at 5 MPa.

Table 6 summarizes the aggregate properties of samples S7-S10. From the LPD and crush percentage data in Table 6, the S3 aggregates and the DX200 aggregates had similar crush strength properties.

Example 4—Unified Wheel Testing (S3 Glass Bond, DX200 Glass Bond)

The SiC aggregates (S7-S10) were evaluated compared to conventional SiC loose grits in coated abrasives nonwoven unified wheels (UWs). Glass bonded SiC aggregates were prepared as follows:

Add SiC grit in mixing bowl of Hobart mixer, under agitation, slowly add organic binder (animal glue) and water till grit surface is coated, then add S3 glass frit and dextrin powders, mix under high speed until a uniform mixture is achieved.

Form the aggregates with a Quadro Comil using mesh 0.99 mm, collect aggregates in ceramic saggers and fire in kiln at 950° C.

Crush and sieve the fired blocks to collect 20/100 aggregates for F100 grit and 20/70 aggregates for F80 grit.

Unified wheels were then prepared as follows:

All collected glass bonded aggregates and loose grits were silane treated.

A nonwoven backing is prepared on an air-laid web line using nylon staples of 15-60 denier with a total weight of 9.0 lbs./RM (1 ream (RM)=330 ft$^2$) and thickness of 5/16" (0.31").

Apply make resin on a non-woven backing (make weight approximately 3-5 lb/RM. The make resin is a solvent based 2-component polyurethane resin cured with an aromatic amine.

Gravity coat grains (aggregate or loose grit) on make resin with grain weight of approximately 25-35 lb/RM on each side of the coated backing.

Spray a light latex coating over the abrasive grains (aggregate or loose grit) to secure the grains on the backing. The web is then dried.

Apply size resin (solvent based 2-component polyurethane resin) onto the grains at an add-on weight of approximately 15-20 lb/RM.

Stack 4 plies of sized sheet with spacers between metal plates. Assemble the stacks under sufficient pressure until the metal plates touch the spacer to ensure a uniform thickness of the assembled slab.

Cure the stacks in oven to form unified sheets. The final thickness of cured slabs was approximately 0.25" and the density was approximately 3.3 lbs/100 in$^3$).

Cut out 3" unified wheels using die-cut from the above cured sheets

Glue center buttons onto the 3" unified wheels

The unified wheels were then tested. Work pieces were 304 stainless steel and 7075 aluminum. Grinding time was 1 minute/cycle and the test was stopped after every 5 cycles with 15 seconds of cooling in between.

Figure 11:
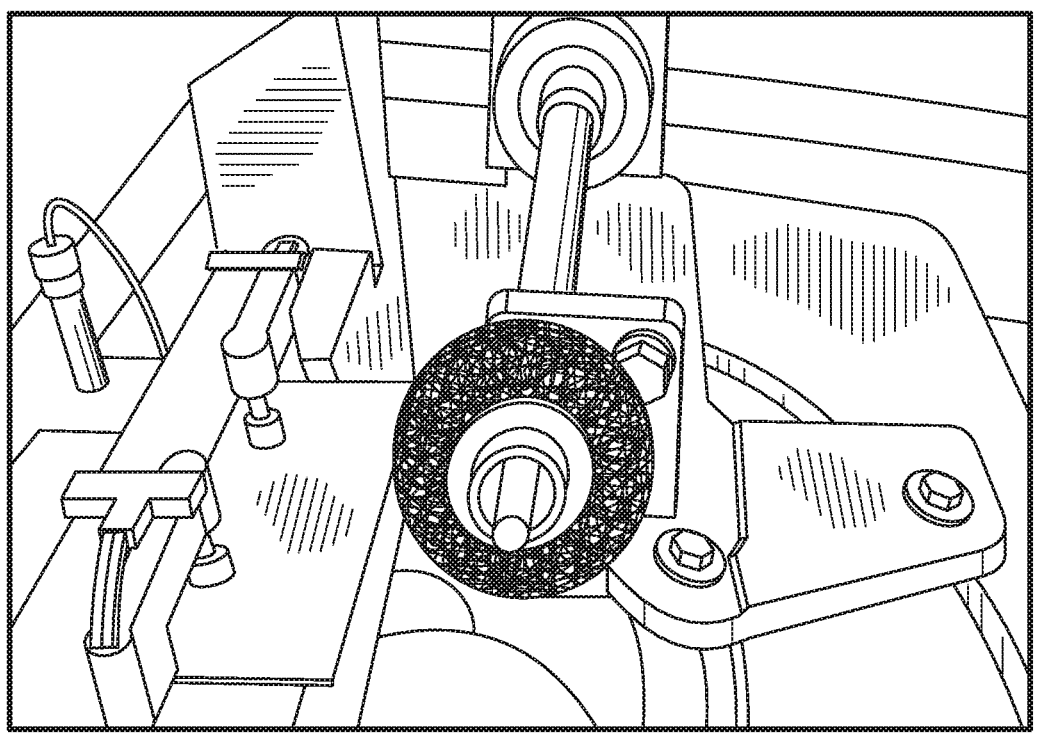
FIG. 11 is an image of a nonwoven abrasive wheel embodiment set up to conduct 90 Degree Angle testing.
Figure 12:
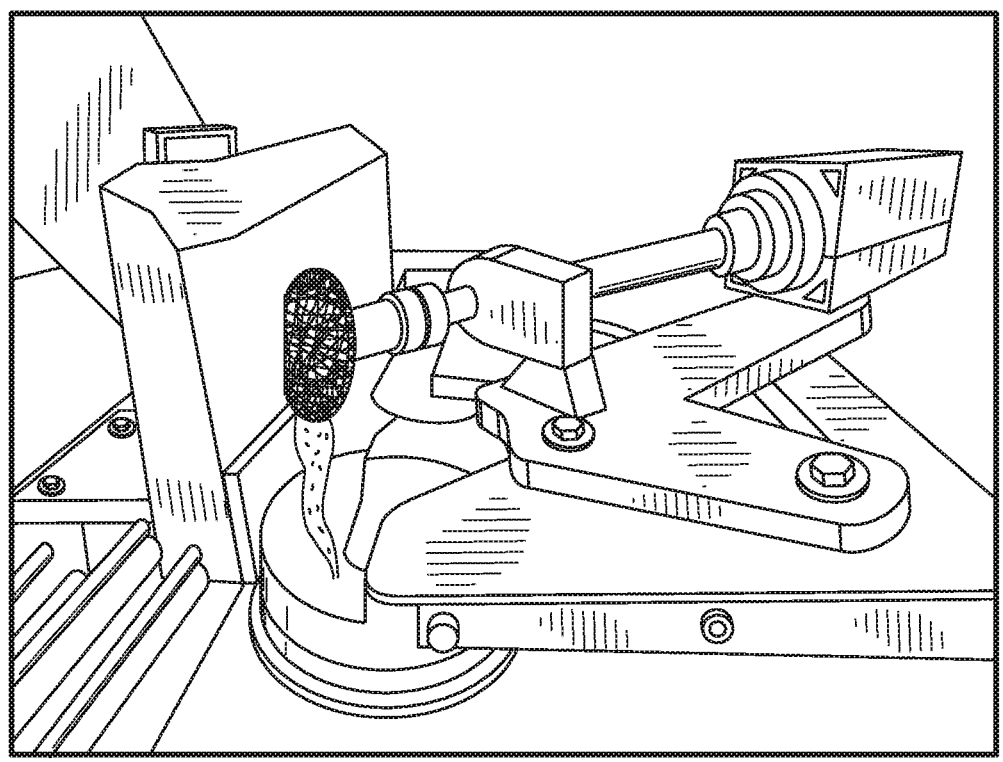
FIG. 12 is an image of a nonwoven abrasive wheel embodiment set up to conduct 45 Degree Angle testing.

FIG. 11 shows the set up for 90° degree testing on thin plate (¼" thick) and thick plate (1" thick, right). FIG. 12 shows the set up for a 7.5° contact angle testing on a flat surface. The test speed was 9000 rpm, dead weight was 3 lbs.

Figure 8A:
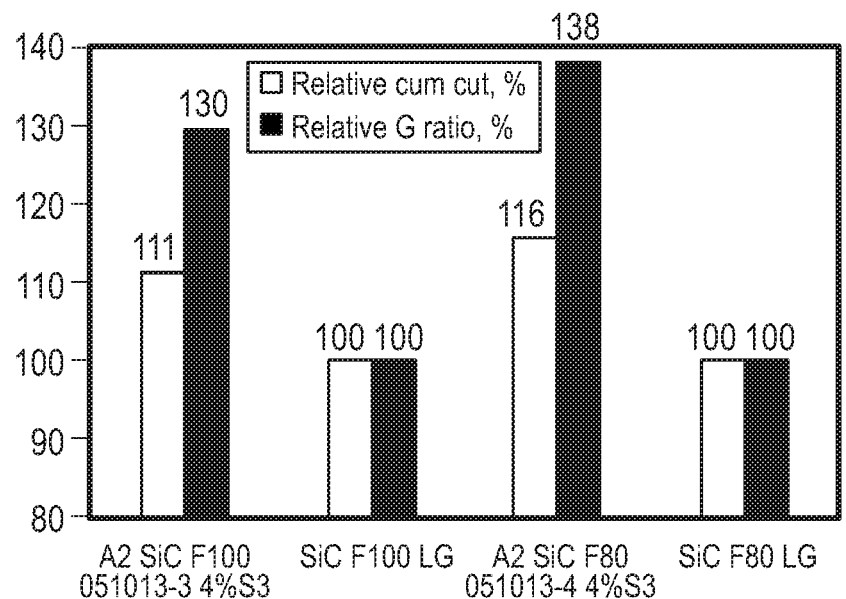
FIG. 8A is a bar graph comparing the abrasive properties of a conventional nonwoven abrasive article to inventive embodiments of nonwoven abrasive articles.
Figure 8B:
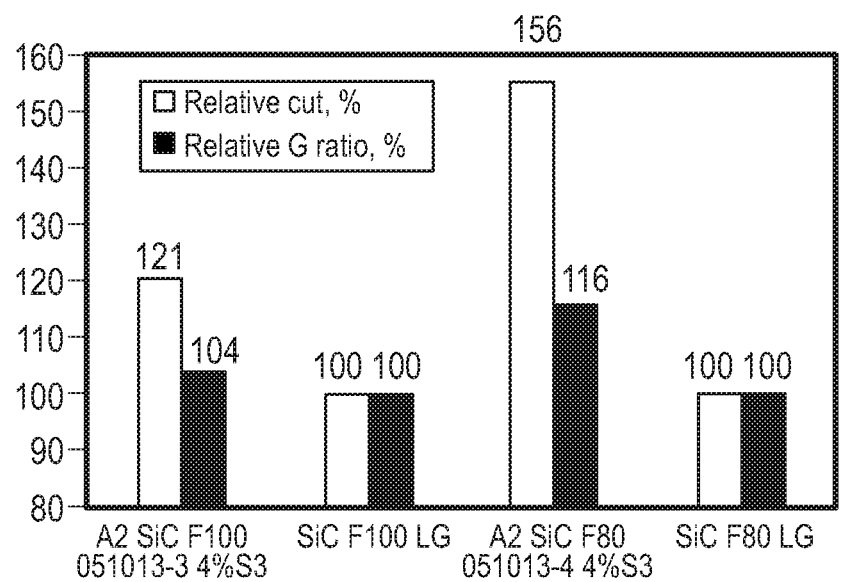
FIG. 8B is a bar graph comparing the abrasive properties of a conventional nonwoven abrasive article to inventive embodiments of nonwoven abrasive articles.
Figure 9A:
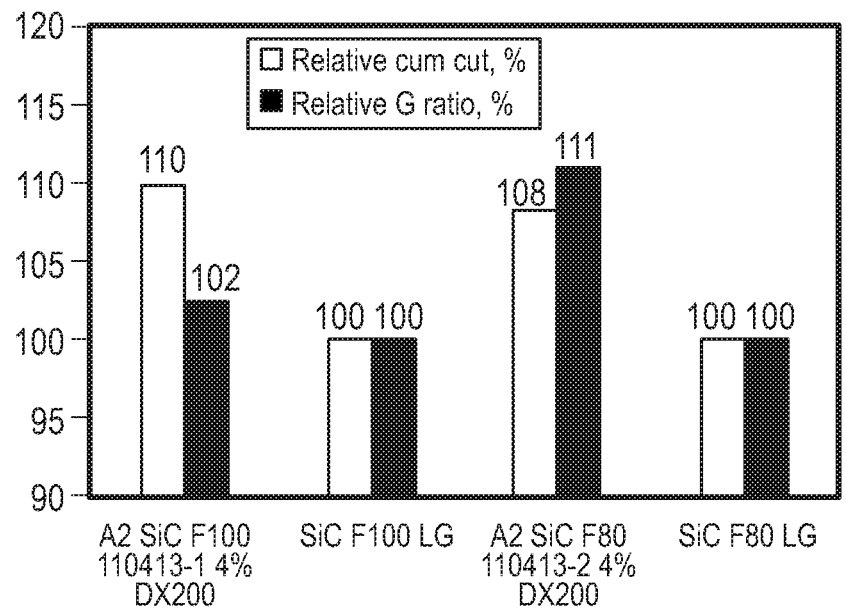
FIG. 9A is a bar graph comparing the abrasive properties of a conventional nonwoven abrasive article to inventive embodiments of nonwoven abrasive articles.
Figure 9B:
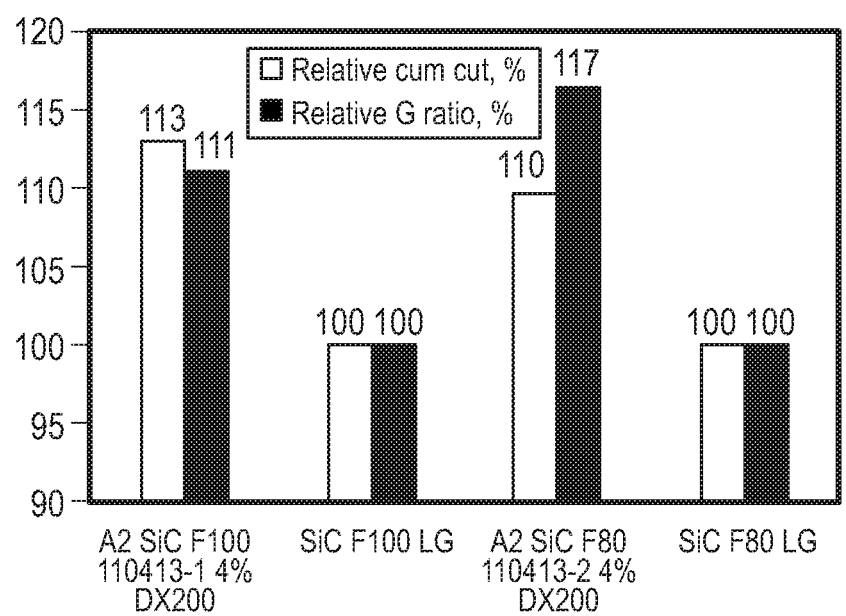
FIG. 9B is a bar graph comparing the abrasive properties of a conventional nonwoven abrasive article to inventive embodiments of nonwoven abrasive articles.

FIGS. 8A, 8B, 9A, and 9B showed the relative cut and grind ratio ("G-ratio") (i.e., the amount of workpiece material cut divided by the amount of material shed from the wheel) of the inventive aggregate wheels versus the comparative loose grit wheels. FIGS. 8A and 8B showed that wheels with S3 bonded SiC F100 and F80 aggregates (Samples S9 and S10) had higher cut and G-ratio than comparative loose grit wheels on both 304SS (90° and 7075Al (7.5°). Similarly, FIGS. 9A and 9B showed that wheels with DX200 bonded SiC F100 and F80 aggregates (Samples S7 and S8) also had a higher cut and G-ratio than comparative loose grit wheels on 304 stainless steel and 7075 aluminum (both 90°). Surprisingly, the oxidation of SiC with S3 bond at the grain/bond interface did not adversely affect grinding performance.

Example 5—Unified Wheel Testing (MJ9 Glass Bond)

Additional inventive unified wheels were prepared in the same manner as described above with regard to Example 4, except the abrasive aggregates included aggregates (S11) of MJ9 glass bond and F220 SiC grit having the composition and properties shown below in Table 7. The fired aggregates had LPD and crush strength as shown in Table 7.

TABLE 7

Abrasive Aggregate S11 Composition and Properties

| Grain ID | Grit | Glass Bond wt % | Bond Type | Firing Temp. ° C. | Organic Binder wt % | Waterwt % | Product Size Cut | LPD g/cm³ |
|---|---|---|---|---|---|---|---|---|
| S11 | F22 | 5.3 | MJ9 | 915 | 3.3 Dex | 2.5 | 30/140 | 0.89 |

Figure 10A:
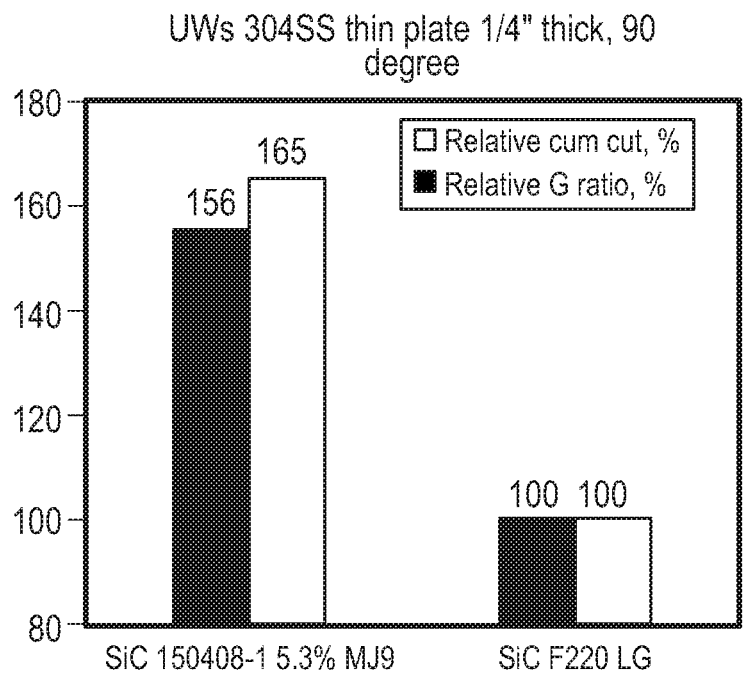
FIG. 10A is a bar graph comparing abrasive properties of a conventional nonwoven abrasive article to an inventive embodiment of a nonwoven abrasive article.
Figure 10B:
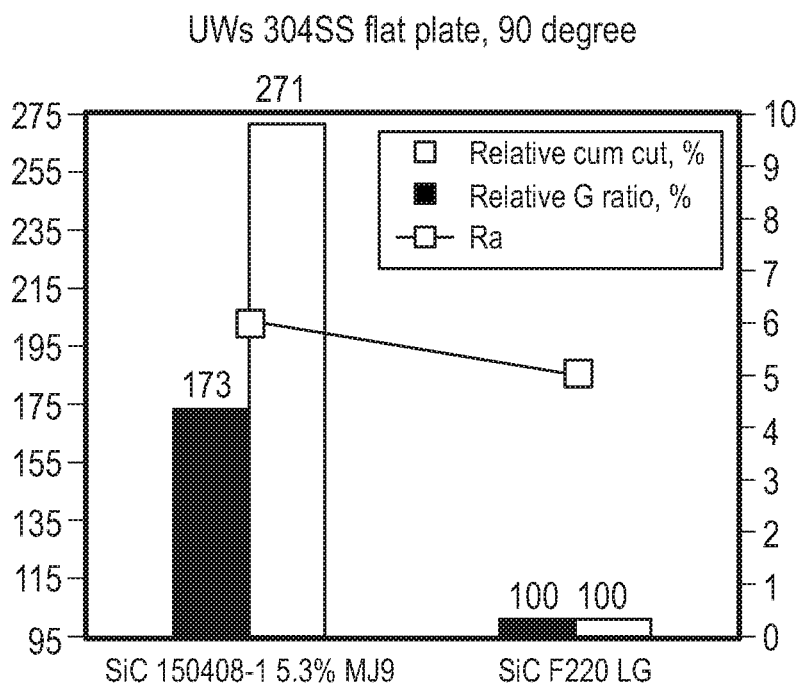
FIG. 10B is a bar graph comparing abrasive properties of a conventional nonwoven abrasive article to an inventive embodiment of a nonwoven abrasive article.

The unified wheels were tested as described above in Example 4 on 304 stainless steel thin plate edge and flat plate with a 90° angle. FIG. 10A shows that inventive wheels including S11 (MJ9 bonded SiC F220) aggregates had approximately 56% higher cut and 65% higher G-ratio than comparative wheels having conventional F220 loose grit on 304SS thin plate and flat surface both at 90° angle. FIG. 10B shows that inventive wheels including S11 (MJ9 bonded SiC F220) aggregates had approximately 73% higher cut and 171% higher G-ratio than comparative wheels having conventional F220 loose grit on 304SS flat surface 90° angle. Further, it was surprising that the surface finish (Ra) produced by the inventive wheels was 6 micro inches, only 1 micro inch more than the 5 micro inch surface produced by the comparative wheels.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article, comprising:
   a substrate comprising a nonwoven web of lofty fibers, wherein the nonwoven web comprises about 50 wt. % to 70 wt. % of a 60 denier fiber and about 30 wt. % to 50 wt. % of a 15 denier fiber; and
   an abrasive composition disposed on and within the nonwoven web, wherein the abrasive composition is adhered to the fibers and comprises a polymeric binder composition and a plurality of abrasive aggregates dispersed in the polymeric binder composition, wherein each of the plurality of abrasive aggregates comprises a vitreous binder composition and a plurality of silicon carbide abrasive grit particles joined by the vitreous binder, and wherein the vitreous binder composition comprises a sintering temperature (Ts) in a range of 700° C. to 1100° C.

2. The abrasive article of claim 1, wherein the vitreous binder composition has a sintering temperature (Ts) in a range of 800° C. to 1000° C.

3. The abrasive article of claim 1, wherein the vitreous binder composition further comprises a glass transition temperature (Tg) in a range of 490° C. to 900° C.

4. The abrasive article of claim 1, wherein the vitreous binder composition comprises not less than 1 wt % and not greater than 15 wt % of a transition metal.

5. The abrasive article of claim 1, wherein the vitreous binder composition comprises about 40 wt % to 65 wt % of acid oxides, about 15 wt % to 30 wt % of amphoteric oxides, and about 15 wt % to 25 wt % of basic oxides and neutral oxides.

6. The abrasive article of claim 1, wherein the abrasive aggregate comprises bubbles dispersed in the vitreous binder at the interface of the vitreous binder and the silicon carbide grit particles.

7. The abrasive article of claim 1, wherein the abrasive aggregate has a loose packed density in a range of not less than 0.5 g/cm³ to not greater than 3.5 g/cm³.

8. The abrasive article of claim 1, wherein the abrasive aggregate has a porosity in a range of 5% to 85% as measured by mercury porosimetry.

9. The abrasive article of claim 1, wherein the silicon carbide grit particles are in a size range of not less than 1 micron and not greater than 2000 microns.

10. The abrasive article of claim 1, wherein the abrasive aggregates have a size in a range of not less than 10 microns and not greater than 4000 microns.

11. The abrasive article of claim 1, wherein the nonwoven web comprises a fiber weight in a range of not less than 1 $g/m^2$ and not greater than 500 g/m2.

12. The abrasive article of claim 1, wherein the abrasive composition comprises from 5.0 wt % to 60.0 wt % polymeric composition.

13. The abrasive article of claim 1, wherein the abrasive composition comprises from 15 wt % to 80.0 wt % abrasive aggregates.

14. The abrasive article of claim 1, wherein the abrasive composition further comprises a filler in an amount ranging from 0 wt % to 30.0 wt % of the abrasive composition.

15. The abrasive article of claim 1, wherein the abrasive article comprises from 50 wt % to 99 wt % abrasive composition.

16. The abrasive article of claim 1, wherein the nonwoven web comprises from 1 wt % to 50 wt % of the abrasive article.

17. The abrasive article of claim 1, wherein the vitreous binder composition comprises not less than 1 wt. % and not greater than 10 wt. % of the weight of each of the plurality of abrasive aggregates, and wherein the silicon carbide abrasive grit particles comprise not less than 90 wt. % and not greater than 99 wt. % of the weight of each of the plurality of abrasive aggregates.

* * * * *